United States Patent [19]

Hodneland

[11] 4,273,231
[45] Jun. 16, 1981

[54] CHUTE BRAKE FOR CONCRETE MIXING VEHICLES

[75] Inventor: Jan Hodneland, Spokane, Wash.

[73] Assignee: Central Pre-Mix Concrete Co., Spokane, Wash.

[21] Appl. No.: 91,578

[22] Filed: Nov. 5, 1979

[51] Int. Cl.³ ............................................. B65G 11/00
[52] U.S. Cl. ........................................ 193/10; 366/68
[58] Field of Search ...................... 193/10, 22, 23, 16; 366/68; 188/72.4

[56] References Cited

U.S. PATENT DOCUMENTS

| | | | |
|---|---|---|---|
| 3,279,766 | 10/1966 | Mendoza | 366/68 |
| 3,334,872 | 8/1967 | Hansen et al. | 366/68 |
| 3,410,538 | 11/1968 | Potter | 366/68 |
| 4,042,072 | 8/1977 | Baba | 188/72.4 X |

Primary Examiner—Robert B. Reeves
Assistant Examiner—Gene A. Church
Attorney, Agent, or Firm—Wells, St. John & Roberts

[57] ABSTRACT

A brake mechanism that enables controlled angular positioning of a concrete chute about a vertical axis on a concrete mixing vehicle. The brake includes an arcuate horizontal rim mounted to the chute on one side of a ring bearing. The rim pivots with the chute. A brake actuator adjacent the rim is selectively operable to clamp the rim and thereby fix the angular position of the chute relative to the ring bearing axis. Complementary surfaces on the rim and brake actuator interlock to assure positive clamping action.

6 Claims, 5 Drawing Figures

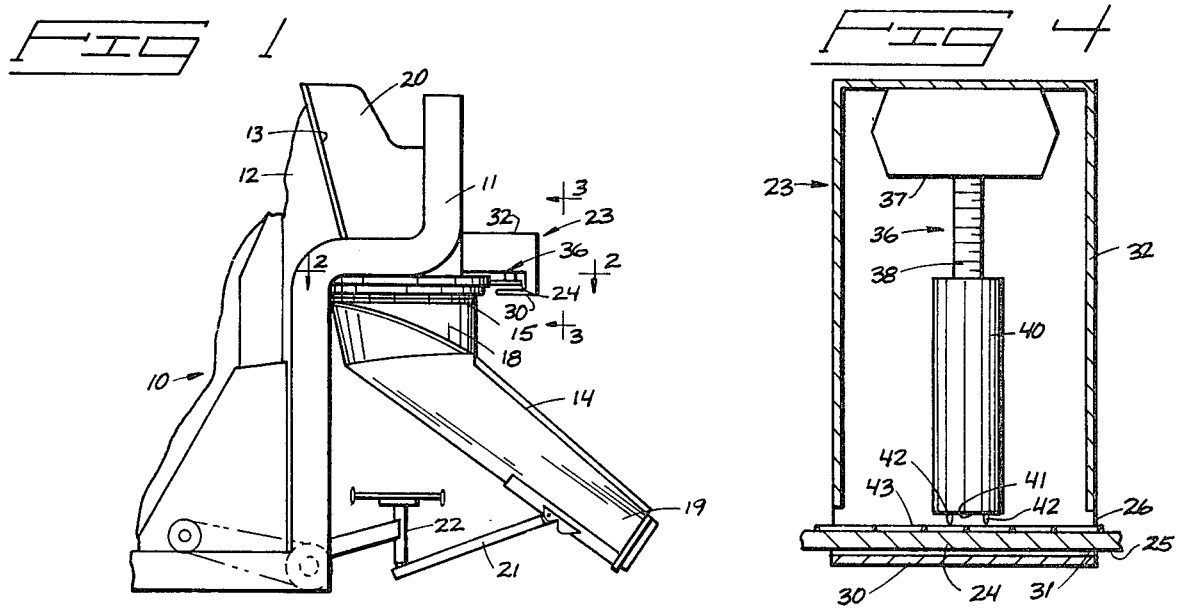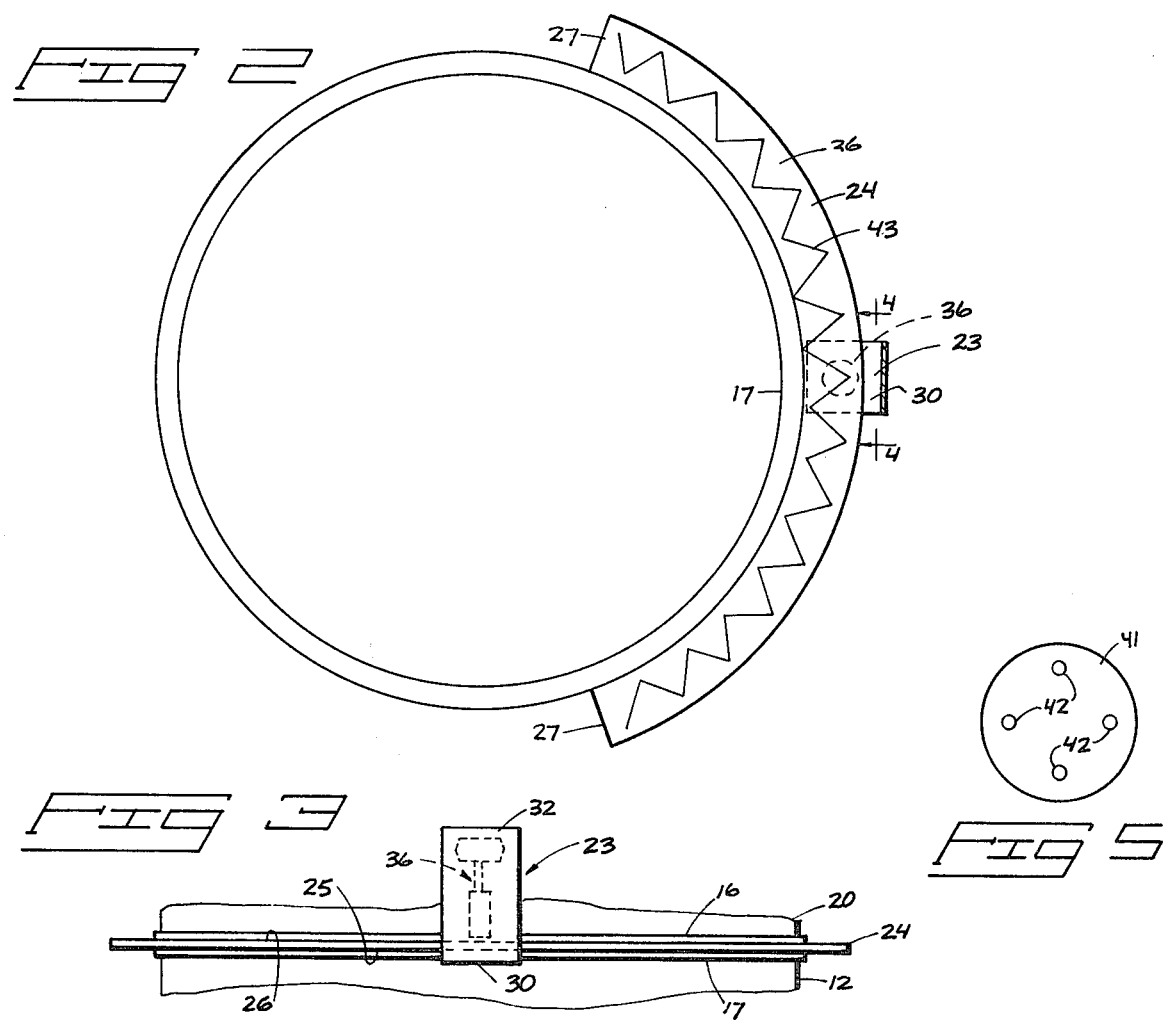

CHUTE BRAKE FOR CONCRETE MIXING VEHICLES

BACKGROUND OF THE INVENTION

The present invention is related to apparatus for selectively locking the angular position of a pivoted concrete chute relative to a vertical axis on the frame of a concrete mixing vehicle.

Concrete mixing and transporting vehicles typically include an angular rotating mixing drum that holds and agitates a wet mixture of concrete during transportation. The mixing drums normally have a capacity of between seven and ten cubic yards of concrete, which weighs approximately 4,000 pounds per cubic yard.

When the concrete is to be delivered, rotation of the drum is reversed to direct concrete outwardly through a rearward discharge. The discharged concrete is received and guided to the poursite by a pivoted chute. The chute is selectively positioned about a vertical axis on the vehicle frame to direct concrete to either side or to the rear of the mixing vehicle. Extensions are frequently employed for directing concrete to more remote locations.

Concrete, at 4,000 pounds per cubic yard, produces high stresses along the chute. Heavy concrete at the end of a long extension can produce severe torsional forces about the inner end of the chute. The chute therefore becomes very difficult to control manually and can easily slip from control, pivoting in whatever direction gravity dictates. A freely pivoted chute can result in the waste of both concrete and resultant man-hours needed for cleanup, and can also be a safety hazard for those working in the area of the chute.

A properly operating chute brake system would enable selective angular positioning of the chute when released and positive locking of the chute at the selected angular position when actuated. Such a brake mechanism should be situated directly adjacent the pivot axis for the chute and directly adjacent the bearing surfaces.

Known forms of chute brake assemblies include a manual operable clamp assembly mounted to a pivoted chute brace. The brake consists of a threaded shaft at one end of an upright brace bearing shaft. A wheel is threadably engaged to the shaft and can be selectively tightened against the shaft journal to clamp the brace tightly to the vehicle frame. The brace-type brake is partially serviceable for standard length chutes. However, the locking mechanism can vibrate loose and allow the chute to pivot freely. Furthermore, the location of the brake mechanism below the actual bearing surfaces between the chute and the vehicle frame does not directly absorb the torque applied about the bearing axis.

It still remains desirable to obtain some form of positive brake mechanism that is easily controlled at the point of pivotal engagement between the frame and chute, to selectively lock the chute at any desired angular position.

U.S. Pat. No. 3,279,766 to F. V. Mendoza discloses a transit concrete mixer with particular reference to a brake mechanism. The mechanism disclosed enables selective angular positioning of a concrete chute. The brake components used are of typical automotive drum brake design with axially oriented shoes and brake surfaces. A hydraulic brake cylinder is utilized for actuation of the brake shoes selectively bringing them radially against a brake drum. The nature of the brake assembly dictates that the entire braking mechanism be mounted below the ring bearing that mounts the chute to the vehicle frame. Actually, the brake assembly replaces the standard hand rotatable brake wheel discussed above. The Mendoza brake therefore represents a simple mechanization of the manually operable brake with additional advantages of remote control ability and less chance of failure due to vibration of the chute and vehicle frame. Forces transmitted along the length of the chute are still directed primarily to the bearing surfaces of the chute above the brake mechanism. The low positioning of the brake therefore causes undesirable stresses along the brace mechanism. Excessive torsional stress would not be incurred if, somehow, the brake mechanism could be supplied adjacent the point of pivotal engagement between the frame and chute.

The problem of braking the pivoted chute at the pivotal mount for the chute is recognized to a limited degree in the U.S. Patent to Hansen et al, U.S. Pat. No. 3,334,872. Hansen et al discloses a double ended piston hydraulic cylinder that controls pivotal movement of a chute at the chute mounting point on the concrete mixing truck. The cylinder operates to pivot the chute about its axis and also acts as a positive brake.

The hydraulic cylinder requires use of an expensive and complex hydraulic system that is not typically supplied as standard equipment on concrete mixing trucks. Hydraulic cylinders wear quickly when exposed to concrete with its naturally abrasive component. Maintenance and repair therefore become frequent. Furthermore, use of a hydraulic cylinder could be considered "overkill", since the primary need is not for powered movement of the chute. The chute is usually empty when moved from one position to another. The primary need is for holding the chute stationary after being angularly positioned, when it is full of heavy concrete.

U.S. Pat. No. 3,410,538 to M. L. Potter discloses a positive locking apparatus for positioning a concrete chute at any of several preselected angular positions. Potter's arrangement uses a positive detent type lock between the chute frame and a plate pivoted with the chute. A pin is used to interconnect the stationary frame with the pivoted plate by insertion within one of several angularly spaced apertures provided in the movable plate.

The Potter device and other known "detent" type chute locking mechanisms do allow positive positioning of the chute at the pivot point between the chute and stationary frame but do not enable infinite angular adjustment for precise pouring. Further, such mechanisms will not effectively operate to stop a moving chute without causing possible damage to the lockout mechanism. Difficulty is also experienced in removing and placing the lock pin when the chute is loaded.

The present invention includes a brake mechanism that can be mounted to existing chute and frame arrangements and that makes use of the existing pneumatic systems typically available for air brakes on the mixing vehicle. The present brake mechanism can be controlled to stop the chute at any selected angular position and hold it securely in place until deactuated. The present brake does not include inherent capability to pivot the chute about its axis and is therefore extremely simple in construction and easy to operate and maintain.

BRIEF DESCRIPTION OF THE DRAWINGS

FIG. 1 is a fragmentary side elevation view showing a mixing drum, frame, chute and elements of the present invention;

FIG. 2 is an enlarged fragmentary sectional view taken along line 2—2 in FIG. 1;

FIG. 3 is an enlarged fragmentary rear elevation view taken along line 3—3 in FIG. 1;

FIG. 4 is an enlarged sectional view taken along line 4—4 in FIG. 2; and

FIG. 5 is an enlarged end view of a shoe element of the present invention.

DETAILED DESCRIPTION OF A PREFERRED EMBODIMENT

The present invention is intended for use on concrete mixing vehicles, a portion of which is shown at 10 in FIG. 1. Such a vehicle 10 typically includes a rigid framework 11 rotatably mounting a concrete mixing drum 12. The drum 12 typically includes a rearwardly facing concrete discharge opening 13 and a downwardly spaced chute 14 for receiving the discharged concrete and directing it to a selected angular position remote from drum 12.

The chute 14 is mounted to the frame 11 by a ring bearing 15. The bearing includes a stationary plate 16 and a rotatable plate 17. The upper chute end 18 is fixed to the rotatable plate 17 and a remote end 19 extends outwardly of the upright pivot axis defined by the bearing 15.

A stationary chute 20 is positioned above the upper pivotal chute end 18. It receives concrete directly from the mixing drum 12 and guides it downwardly to fall through the opening of the ring bearing 15 into chute 14. The stationary plate 16 of the ring bearing may be secured to an open lower end of the stationary chute 20.

The chute 14 is braced by an arm 21 extending from the frame 11 to the lower chute end 19. The brace arm 21 is pivoted at 22 to the frame, coaxially with the ring bearing axis.

The present concrete brake assembly is shown generally at 23. It is selectively operable to lock the chute at a selected angular position about the vertical axis of bearing 15. The brake assembly 23 is mounted directly to the vehicle and operates in conjunction with the ring bearing 15 to control positioning of the chute.

The brake assembly 23 includes an arcuate anchor rim 24. Rim 24 is fixed to the rotatable plate 17 of ring bearing 15. It is centered coaxial with the bearing axis. Rim 24 includes a first or bottom surface 25 and a parallel second or top surface 26. Both surfaces 25 and 26 are horizontal and are spaced apart to define the thickness of the plate. The rim 24 extends angularly about the axis between ends 27 (FIG. 2) that are spaced apart angularly by a distance slightly greater than the allowable pivot angle for the chute 14. The rim 24 is centered angularly on a vertical plane passing through the axis of bearing 15.

A rigid brace 30 is provided as means for slidably engaging the bottom surface 25 of the anchor rim 24. It includes an upwardly facing surface 31 that slidably engages the rim. Surface 31 is formed as an integral part of a supporting frame 32. The frame 32 is operatively mounted to the stationary plate 16 since both are mounted directly to the framework 11. Brace 30 will therefore remain stationary while the anchor rim 24 pivots with selective pivotal movement of the chute 20.

A brake actuator 36 is shown in detail in FIG. 4. The brake actuator 36 is provided as means for selectively clamping the anchor rim against the brace 30, thereby preventing pivotal movement of the chute 14 around the vertical bearing axis.

The brake actuator 36 includes a selectively extensible ram 37. The ram 37 is mounted to the frame 32 and includes a downwardly projecting piston shaft 38. The shaft 38 is threaded to receive a collar 40. The collar is selectively adjustable on the threaded shaft to position a shoe 41 on a bottom side of the collar with respect to the top surface 26 of rim 24. Extension of ram 37 will cause engagement of the shoe 41 and surface 26. The ram 37 is preferably pneumatic and controlled by standard air pressure valving mechanism (not shown) to expand and contract. The ram is preferably a typical air cylinder currently used for applying "air brakes" on heavy duty vehicles.

Shoe 41 is illustrated in detail in FIGS. 4 and 5. It includes downward projections 42 that are spaced about the shoe surface area. The projections 42 are designed to interlock with a similarly textured surface on the anchor rim 24. Preferably the textured surface is formed of a raised bead 43. It is also preferred that the bead 43 have a "zigzag" configuration as shown by FIG. 2. The zigzag configuration enables straddling of the bead by the projections 42 of shoe 41. The projections 42 and bead 43 can therefore mechanically interlock at substantially any selected angular position of the chute about the upright pivotal axis.

The present brake assembly may be provided in kit form. Therefore, prior to operation, the assembly must first be mounted to a concrete mixing vehicle 10. This is done by welding or otherwise securing the anchor rim 24 to the rotatable bearing plate 17. The rim 24 is selectively positioned on the plate so that its ends 27 are equiangularly spaced from a longitudinal vertical plane passing through the chute pivot axis when chute 14 is projected directly rearward from the vehicle.

Next, the supporting frame 32 (which already mounts the brake actuators) can be secured to the frame 11 or stationary plate 16. The frame 32 is preferably centered on a longitudinal vertical plane passing through the vehicle frame. When properly positioned, the brace surface 31 will be situated in close proximity to the bottom surface 25 of the rim 24. In fact, the surfaces can be situated so that the rim will lightly touch the surface 31 and slide over it as the chute is pivoted back and forth.

The extensible ram 27 may then be connected with an air pressure supply typically provided on the form of truck used to carry the mixing components. Appropriate valves (not shown) can be located adjacent to the chute for controlling operation of the chute brake. The brake mechanism is then ready for use.

The vehicle is first positioned as close as possible to the pour site. The chute brake, in a released, inoperative condition, then allows selective positioning of the chute and attachd extensions, if any, to position the lower discharge chute end 19 directly over the pour site.

The chute brake is actuated through the appropriate switching mechanisms when the selective angular position is achieved. The extensible ram 37 drives the piston shaft 38 and shoe 41 forceably downward against the rim 24. The rim 24 is thereby clamped securely between the shoe 41 and the brace surface 31. Further pivotal movement of the chute about the pivot axis is also hindered by the projections 42 interlocking with the zigzag bead 44. The brake will remain actuated until the appropriate control valve device is operated to allow escape of air pressure from the ram 37. At such time, the piston shaft 38 and shoe 41 will contract upwardly, due to internal spring forces, disengaging rim 24 and allowing relatively free pivotal movement of the chute about its axis.

The above description and attached drawings are given by way of example to set forth the preferred form of the present invention. Alternate forms, however, fall within the scope of the following claims.

What is claimed is:

1. A chute brake for a concrete mixing vehicle having a mixing drum movably mounted to a supporting framework, a horizontal ring bearing with an annular stationary bearing plate fixed to the framework and a coaxial rotatable bearing plate movably suspending the chute from the framework at a location adjacent the mixing drum for pivotal movement of the chute about a vertical bearing axis, the chute brake comprising:

a horizontal arcuate anchor rim fixed to one of the bearing plates and arranged coaxially about the bearing axis, said rim having top and bottom opposed horizontal surfaces;

rigid brace means fixed to the framework at a location elevationally adjacent one surface of the anchor rim, for slidably engaging said one surface; and brake actuator means operably mounted to the framework adjacent the remaining surface of the anchor rim opposite the brace means for selectively clamping the anchor rim against the brace means to selectively prevent pivotal movement of the chute relative to the framework about the bearing axis.

2. The chute brake as defined by claim 1 further comprising:

a textured surface along said remaining surface of the anchor rim;

a shoe on the brake actuator means for engaging the textured surface; and a textured surface on the shoe adapted to interlock with the textured surface on the anchor rim.

3. The chute brake as defined by claim 2 wherein the textured surface on the anchor rim is comprised of a raised bead formed along a zigzag line along the rim and wherein the textured surface on the shoe is comprised of projections on the shoe spaced apart to selectively interlock with the raised bead.

4. The chute brake as defined by claim 1 wherein:
   the anchor rim is mounted to the rotatable bearing plate and wherein the brace means and brake actuator means are operatively mounted to the stationary bearing plate.

5. The chute brake as defined by claim 1 further comprising a raised bead formed in a zigzag path along the opposite side surface of the anchor rim;

a shoe on the actuator means for engaging the rim; and spaced projections on the shoe for engaging the anchor rim astride of the bead.

6. A chute brake for a concrete mixing vehicle having a mixing drum movably mounted to a supporting framework, a stationary chute, a horizontal ring bearing with an annular stationary bearing plate fixed about the lower end of the stationary chute, a movable chute, and a coaxial rotatable bearing plate movably suspending the movable chute from the lower end of the stationary chute at a location adjacent the mixing drum for pivotal movement of the chute about a vertical center bearing axis; the chute brake comprising:

a horizontal arcuate anchor rim fixed to the stationary bearing plate and arranged coaxially about the bearing axis, said rim including top and bottom opposed surfaces projecting radially outward beyond the stationary bearing plate;

a rigid brace fixed to the framework and having an upwardly facing surface thereon in slidable engagement with the bottom surface of the anchor rim;

and a brake actuator movably mounted to said brace in opposition to said upwardly facing surface, said brake actuator being adapted to selectively clamp the anchor rim against the upwardly facing surface of the brace by engagement of the upper surface of the anchor rim.

* * * * *